Jan. 30, 1934.   A. WEICKMAN ET AL   1,945,458
RESILIENT SUPPORT FOR SEATS
Filed July 28, 1932    2 Sheets-Sheet 1

WITNESS

Hugh H. Ott

INVENTORS
Albert Weickman
Charles F. Weickman
BY
Munn & Co
ATTORNEYS.

Jan. 30, 1934.    A. WEICKMAN ET AL    1,945,458
RESILIENT SUPPORT FOR SEATS
Filed July 28, 1932    2 Sheets-Sheet 2
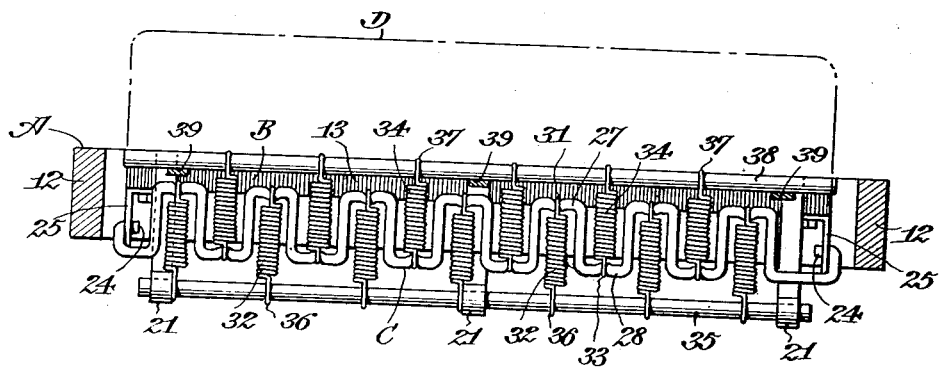
Fig. 3.
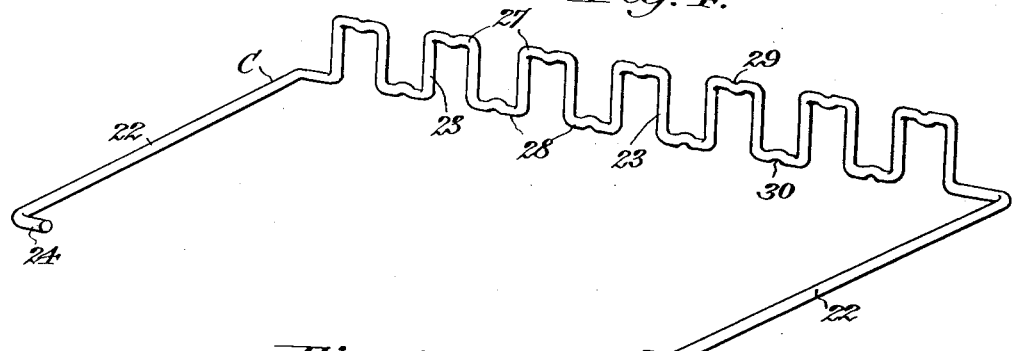
Fig. 4.
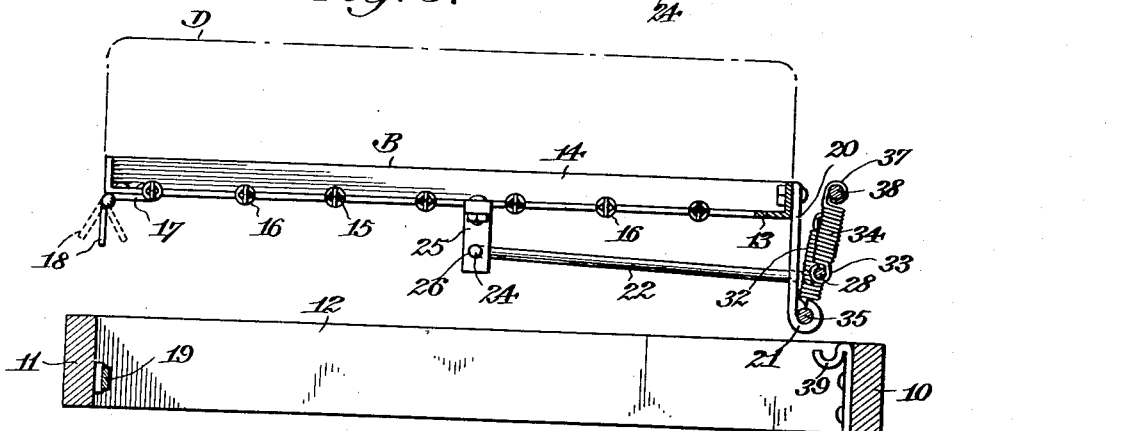
Fig. 5.
WITNESS    Fig. 6.
Hugh H. Ott
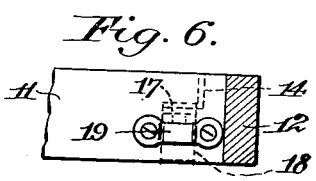
INVENTOR
Albert Weickman
Charles F. Weickman
BY
Munn & Co.
ATTORNEYS.

Patented Jan. 30, 1934

1,945,458

UNITED STATES PATENT OFFICE 1,945,458

RESILIENT SUPPORT FOR SEATS

Albert Weickman and Charles F. Weickman, Harrison, N. Y.

Application July 28, 1932. Serial No. 625,445

2 Claims. (Cl. 155—179)

This invention relates generally to the class of supports, and has particular reference to a support for the seat of a vehicle, a chair, a lounge or other similar articles, the same being in the nature of an improvement upon a seat support of the type set forth in prior United States Letters Patents Nos. 1,027,949, 1,584,577 and 1,701,831.

In addition to attaining in an improved manner some of the same general objects of the invention set forth in the prior patents above referred to, the present invention aims to generally improve the structure of such devices, reduce their cost of production and increase the efficiency thereof.

More particularly, the invention resides in the provision of a seat support in which the seat carrier and its resilient mounting are formed as a unit which is capable of being readily removed from or emplaced within the chair frame, vehicle body or other equivalent article, thereby rendering the same more sanitary, due to the ease with which it may be cleansed, sprayed or otherwise treated to remove foreign matter, vermin or the like.

As a further feature, the invention embodies a seat support including a floating tensioned connecting yoke carried by the seat carrier and by virtue of which the jars and shocks may be absorbed with a lesser degree of vertical movement of the movable end of the seat, while the yielding movement is more uniformly controlled and reacts without any perceptible difference to the varying weights imposed upon the seat, it being further found that due to the particular construction and arrangement and the consequent lesser necessary degree of movement, the seat carrier may be disposed in closer proximity to the adjacent rail of the frame, thereby making for a more practical and neater construction.

The invention further resides in a resilient support for a seat, which has the required structural strength to fully withstand any usage to which it may be subjected without a likelihood of becoming distorted or broken but which is so constructed as to afford ready access thereto in event by any remote chance it should become necessary to effect repairs thereto.

The invention more specifically resides in the novel construction of the yoke and spring bearing bight portion thereof, by virtue of which a greater relative movement or deflection of the seat is obtained from a lesser proportional spring extension, while shorter springs with a lesser degree of extension are necessary, thereby increasing the length of life and usefulness of the springs.

With the above recited and other objects in view, reference is had to the following description and accompanying drawings, in which there is exhibited one example or embodiment of the invention, while the claims define the actual scope of the same.

In the drawings:

Figure 3 is a transverse vertical sectional view taken approximately on a plane indicated by the line 3—3 in Figure 1.

Figure 4 is a perspective view of the yoke.

Figure 5 is a sectional view similar to Figure 2, illustrating the seat carrier removed from the stationary frame and disposed in juxtaposition thereto.

Figure 6 is a fragmentary detailed sectional view of the article frame showing the detachable hinged means of connection between the seat carrier and frame.

Figure 1:
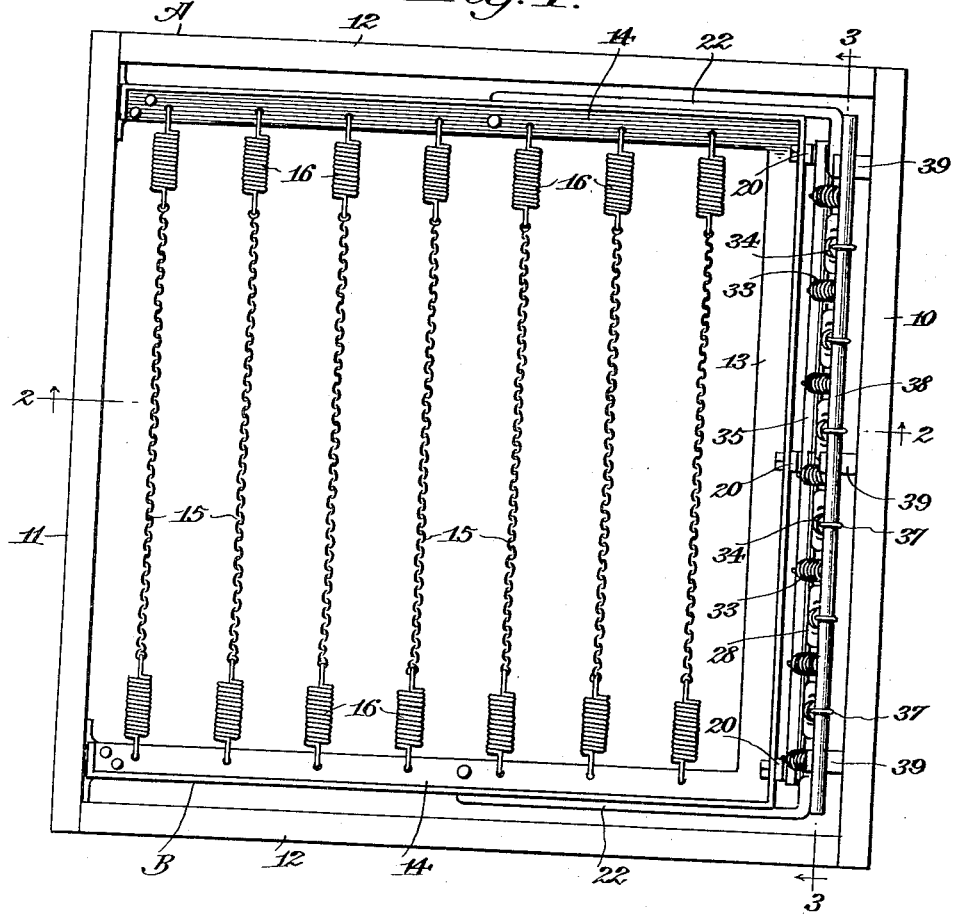
Figure 1 is a top plan view of a seat support constructed in accordance with the invention, the seat being removed.
Figure 2:
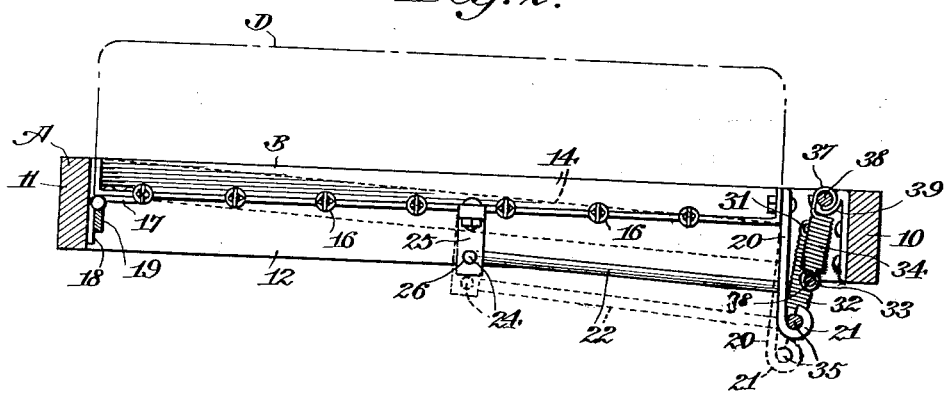
Figure 2 is a longitudinal sectional view on a vertical plane indicated approximately by the line 2—2 in Figure 1, illustrating in full and dotted lines the normal and depressed position of the seat carrier, the seat being shown in dot and dash lines.

Referring to the drawings by characters of reference, A designates generally the frame of a chair or equivalent article which carries a seat. As illustrated, the frame A includes rear and front rails 10 and 11 and side rails 12. The seat carrier, which is designated generally by the reference character B, is in the present instance shown as constructed of angle iron having a rear rail 13 and side rails 14, between which side rails there extends a plurality of parallel chains or equivalent flexible elements 15 which are attached to the side rails by coiled contractile springs 16. As shown, the forward terminals of the side rails 14 have each secured thereto one leaf 17 of a hinge, the opposite leaf 18 of each of which is designed to be removably inserted in a receiver loop 19 carried by the inner surface of the front rail 11 of the article frame A, whereby the said carrier B is detachably and hingedly connected with the article. The opposite rear end of the seat carrier B has attached to and depending from its rear rail 13 at transversely spaced points, the legs 20, the lower ends of which are fashioned to provide eyes or other equivalent bearings 21.

In order to provide means for yieldably supporting the rear end of the seat rest B, a yoke, designated generally by the reference character C, is employed, which includes a pair of side arms 22 joined at the rear ends by a transverse bight 23 and provided at the forward ends with inwardly directed trunnions 24. The seat rest B is formed at its opposite sides with depending trunnion bearing brackets 25 which are secured to and depend from the side rails 14 of the seat carrier and which are located substantially intermediate the front and rear of the seat carrier. The brackets 25 are formed with aligned trunnion bearing openings 26 which receive the trunnions 24 of the yoke C. The bight 23 of the yoke is alternately bent upwardly and downwardly to provide upper and lower spring seats 27 and 28, which seats are in turn offset or otherwise fashioned to provide the notches 29 and 30. The upper spring seats 27 receive in the notches 29 thereof, the terminal eyes 31 of depending coiled contractile springs 32, while the lower spring seats 28 receive in the notches 30 thereof, the lower terminal eyes 33 of upstanding coiled contractile springs 34. The eyes or bearings 21 of the legs 20 receive a cross rod 35. The cross rod 35 also serves as a bearing for the lower terminal eyes 36 of the depending springs 32. The upper terminal eyes 37 of the springs 34 are received upon an upper cross rod 38, which seats or bears in the upwardly opening hooked bearing brackets 39 which are secured to the inner surface of the rear cross rail 10 of the article frame A.

Under the construction and arrangement described, it will be observed that a seat D supported by the carrier B is mounted or fulcrumed for yieldable movement with the carrier B. When the weight of the user is imposed upon the seat D, the seat moves downwardly with the carrier B, which swings on the hinges as a fulcrum. As the rear end of the seat and frame move downwardly, it will be observed that the floating yoke C moves with and relative to the carrier B. The springs 32 and 34, which are of substantially the same size and strength, are stretched approximately an equal degree as the carrier B moves downwardly and draws and swings the yoke C downwardly. Due to the construction of the bight portion 23 of the yoke and the arrangement or disposition of the springs, the springs may be made shorter than if single springs were used extending between the cross rods 35 and 38 while longer springs may be used in conjunction with the floating yoke principle if the bight of the yoke were straight and not provided with offsets. Furthermore, springs of combined greater length may be used which are in action stretched to a lesser degree so as to increase their length of life and usefulness. The arrangement also makes for a more compact arrangement and due to the lesser degree of movement of the seat and seat frame to absorb the shocks and jars, the rear rail 13 of the seat carrier may be disposed in closer proximity to the adjacent rear rail 10 of the frame A. It will be further found in practice that due to the manner in which the support is constructed, the seat carrier yoke and tension means may be readily removed from the article frame A by merely lifting the same therefrom, as shown in Figure 5. This will afford ready means for gaining access to the seat and seat mounting for effecting repairs thereto or cleansing or spraying the same. It will be further observed that the support as constructed is extremely strong and durable and that there is small likelihood of distortion or breakage of the various parts, due to the manner in which it is constructed.

While there has been illustrated and described a preferred embodiment of the invention, it is to be understood that no limitation is intended thereby to the precise structural details, which may be varied within the scope of the invention.

What is claimed is:

1. A resilient support for seats including in combination a stationary frame, a seat carrier hinged at one side to the frame, a rod fixed to the seat support at its free end, a floating element located between the support and the rod and having high and low points, a series of coiled springs connecting the high points of the floating element with the rod, and a second series of coiled springs connecting the low points of the floating element with the stationary frame, said floating element having members extending forwardly therefrom and pivotally connected to the seat carrier.

2. A resilient support for seats including a stationary frame, a seat carrier having hinged connection at one side with the frame, a yoke fulcrumed to the seat carrier and contractile means respectively connecting the yoke to the free opposite side of the seat carrier and to the stationary frame for holding the free side of the seat carrier in a normal elevated position, for controlling the depression of the free side of the seat frame and for returning the seat frame to a normal position, said yoke including side arms and a connecting bight having alternate downwardly and upwardly offset bearing portions for accommodating the several contractile means so that the length of said contractile means overlaps.

ALBERT WEICKMAN.
CHARLES F. WEICKMAN.